United States Patent
Fan et al.

(10) Patent No.: US 11,556,601 B2
(45) Date of Patent: Jan. 17, 2023

(54) METHOD FOR SORTING GEOGRAPHIC LOCATION POINT, METHOD FOR TRAINING SORTING MODEL AND CORRESPONDING APPARATUSES

(71) Applicant: Baidu Online Network Technology (Beijing) Co., Ltd., Beijing (CN)

(72) Inventors: Miao Fan, Beijing (CN); Jizhou Huang, Beijing (CN); Yufan Hou, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 42 days.

(21) Appl. No.: 16/952,940

(22) Filed: Nov. 19, 2020

(65) Prior Publication Data

US 2021/0357468 A1    Nov. 18, 2021

(30) Foreign Application Priority Data

May 15, 2020 (CN) .......................... 202010414943.4

(51) Int. Cl.
*G06F 16/9535* (2019.01)
*G06F 16/954* (2019.01)
(Continued)

(52) U.S. Cl.
CPC ........ *G06F 16/9535* (2019.01); *G06F 16/954* (2019.01); *G06K 9/6257* (2013.01); *H04L 67/535* (2022.05)

(58) Field of Classification Search
None
See application file for complete search history.

(56) References Cited

U.S. PATENT DOCUMENTS 9,916,362 B2 * 3/2018 Parundekar ........ G06Q 30/0251
2010/0030578 A1 * 2/2010 Siddique ................. H04W 4/00
705/26.1
(Continued)

FOREIGN PATENT DOCUMENTS

CN    102594905 A    7/2012
CN    103954277 A    7/2014
(Continued)

OTHER PUBLICATIONS

First Office Action and Search Report from CN app. No. 202010414943.4, dated Mar. 11, 2021, with English translation from Global Dossier.
(Continued)

*Primary Examiner* — Robert W Beausoliel, Jr.
*Assistant Examiner* — Cheryl M Shechtman
(74) *Attorney, Agent, or Firm* — Ladas & Parry, LLP

(57) ABSTRACT

A method for sorting geographic location points, a method for training a sorting model and corresponding apparatuses are disclosed, which relates to the technical field of big data. A specific implementation solution is: receiving a query request for geographic location points of a vertical class from a user; inputting candidate geographic location point data of the vertical class into a preference model of the user, to obtain a preference score of the user for each candidate geographic location point; inputting the preference score of the user for each candidate geographic location point into a sorting model as one of sorting features of each candidate geographic location point, to obtain a sorting score of each candidate geographic location point; and determining, according to the sorting score of each candidate geographic location point, a query result returned to the user. The present disclosure can integrate preference factors of a user into sorting when the user queries geographic location points
(Continued)

of a vertical class, so that query results can meet the user's personalized needs.

16 Claims, 6 Drawing Sheets

(51) Int. Cl.
*H04L 67/50* (2022.01)
*G06K 9/62* (2022.01)

(56) References Cited

U.S. PATENT DOCUMENTS

| | | | |
|---|---|---|---|
| 2015/0161271 | A1 | 6/2015 | Gur et al. |
| 2015/0362329 | A1* | 12/2015 | Zhang ................... H04W 4/029 701/532 |
| 2016/0350426 | A1 | 12/2016 | Wu et al. |
| 2017/0103088 | A1* | 4/2017 | Tuukkanen ......... G06F 16/9537 |
| 2018/0143998 | A1 | 5/2018 | Prahladka et al. |
| 2018/0225320 | A1* | 8/2018 | Saini ..................... G06F 16/215 |
| 2018/0322203 | A1 | 11/2018 | Zhang et al. |
| 2019/0311275 | A1 | 10/2019 | Huang et al. |
| 2020/0151205 | A1 | 5/2020 | Wu et al. |
| 2020/0349467 | A1* | 11/2020 | Teague ................ G06F 16/9027 |
| 2021/0056571 | A1* | 2/2021 | Su ....................... G06Q 30/0201 |
| 2021/0103580 | A1* | 4/2021 | Schierz ............... G06F 16/2365 |

FOREIGN PATENT DOCUMENTS

| | | | |
|---|---|---|---|
| CN | 106919641 | A | 7/2017 |
| CN | 110348895 | A | 10/2019 |
| CN | 111026957 | A | 4/2020 |
| JP | 2012053863 | A | 3/2012 |
| JP | 2019185716 | A | 10/2019 |
| JP | 2020501211 | A | 1/2020 |
| WO | WO-2021221563 | A1 * | 11/2021 |

OTHER PUBLICATIONS

Extended European Search Report from EP app. No. 21164602.1, dated Sep. 16, 2021, all pages.
Office Action for Japanese Application No. 2021-081414 dated Jul. 5, 2022 (machine translation by Global Dossier).
Second Office Action for Chinese Patent Application 202010414943.4 dated Jun. 30, 2021 (machine translation by Global Dossier).
Notice of Rejection for Chinese Patent Application 202010414943.4 dated Oct. 11, 2021 (machine translation by Google Translate).

* cited by examiner

METHOD FOR SORTING GEOGRAPHIC LOCATION POINT, METHOD FOR TRAINING SORTING MODEL AND CORRESPONDING APPARATUSES

The present application claims the priority of Chinese Patent Application No. 202010414943.4, filed on May 15, 2020, with the title of "Method for sorting geographic location point, method for training sorting model and corresponding apparatuses". The disclosure of the above application is incorporated herein by reference in its entirety.

FIELD OF THE DISCLOSURE

The present disclosure relates to the technical field of computer application, and particularly to the technical field of big data.

BACKGROUND OF THE DISCLOSURE

Users often have such requirements in the process of using map applications: when they want to find some hotels without a clear focus, they may input POI (Point Of Interest)-type keywords such as "hotel", "inn" and "guesthouse" into the search box; or click a "Hotel" button in a "Find Around" interface to query all hotel-type POIs nearby. The map applications may sort candidate hotel POIs and recommend the hotel POIs to the users based on sorting results.

However, in the existing technology, the candidate hotel POIs are often sorted based on hotel features such as geographic location, hotel evaluation, star rating, price and popularity. For all users, the sorting results obtained based on the same geographic location are the same, which cannot meet the users' personalized needs.

SUMMARY OF THE DISCLOSURE

In view of this, the present disclosure provides the following technical solutions to meet users' personalized query needs.

In a first aspect, the present disclosure provides a method for sorting geographic location points, the method comprising:

receiving a query request for geographic location points of a vertical class from a user;

inputting candidate geographic location point data of the vertical class into a preference model of the user, to obtain a preference score of the user for each candidate geographic location point;

inputting the preference score of the user for each candidate geographic location point into a sorting model as one of sorting features of each candidate geographic location point, to obtain a sorting score of each candidate geographic location point; and determining, according to the sorting score of each candidate geographic location point, a query result returned to the user.

In a second aspect, the present disclosure provides a method for training a sorting model, the method comprising:

acquiring first training data from map application data, the first training data comprising: geographic location point data of a vertical class historically accessed by a user, the access comprising query, click, or field visit;

training a preference model of the user by using the first training data;

acquiring a preference score of the user for each geographic location point of the vertical class in second training data by using the preference model of the user; and training the sorting model by using the second training data, wherein the preference score of the user for each geographic location point in the second training data is taken as one of sorting features for training the sorting model.

In a third aspect, the present disclosure provides an electronic device, comprising:

at least one processor; and a memory communicatively connected with the at least one processor;

wherein the memory stores instructions executable by the at least one processor, and the instructions are executed by the at least one processor to enable the at least one processor to perform a method for sorting geographic location points, wherein the method comprises:

receiving a query request for geographic location points of a vertical class from a user;

inputting candidate geographic location point data of the vertical class into a preference model of the user, to obtain a preference score of the user for each candidate geographic location point;

inputting the preference score of the user for each candidate geographic location point into a sorting model as one of sorting features of each candidate geographic location point, to obtain a sorting score of each candidate geographic location point; and determining, according to the sorting score of each candidate geographic location point, a query result returned to the user.

In a fourth aspect, the present disclosure further provides an electronic device, comprising:

at least one processor; and a memory communicatively connected with the at least one processor;

wherein the memory stores instructions executable by the at least one processor, and the instructions are executed by the at least one processor to enable the at least one processor to perform a method for training a sorting model, wherein the method comprises:

acquiring first training data from map application data, the first training data comprising: geographic location point data of a vertical class historically accessed by a user, the access comprising query, click, or field visit;

training a preference model of the user by using the first training data;

acquiring a preference score of the user for each geographic location point of the vertical class in second training data by using the preference model of the user; and training the sorting model by using the second training data, wherein the preference score of the user for each geographic location point in the second training data is taken as one of sorting features for training the sorting model.

In a fifth aspect, the present disclosure further provides a non-transitory computer-readable storage medium storing computer instructions therein, wherein the computer instructions are used to cause the computer to perform a method for sorting geographic location points, wherein the method comprises:

receiving a query request for geographic location points of a vertical class from a user:

inputting candidate geographic location point data of the vertical class into a preference model of the user, to obtain a preference score of the user for each candidate geographic location point;

inputting the preference score of the user for each candidate geographic location point into a sorting model as one of sorting features of each candidate geographic location point, to obtain a sorting score of each candidate geographic location point; and determining, according to the sorting score of each candidate geographic location point, a query result returned to the user.

In a sixth aspect, the present disclosure further provides a non-transitory computer-readable storage medium storing computer instructions therein, wherein the computer instructions are used to cause the computer to perform a method for training a sorting model, wherein the method comprises:

acquiring first training data from map application data, the first training data comprising: geographic location point data of a vertical class historically accessed by a user, the access comprising query, click, or field visit;

training a preference model of the user by using the first training data;

acquiring a preference score of the user for each geographic location point of the vertical class in second training data by using the preference model of the user; and training the sorting model by using the second training data, wherein the preference score of the user for each geographic location point in the second training data is taken as one of sorting features for training the sorting model.

It can be seen from the above technical solutions that the present disclosure can integrate preference factors of a user into sorting when the user queries geographic location points of a vertical class, so that query results can meet the user's personalized needs and the user can rapidly find a geographic location point meeting his own preference in the query results, which reduces the number of times the user goes through and clicks the query results, saves the user's time, and improves the user's experience in query with map applications.

Other effects of the above optional manners will be explained below in combination with specific embodiments.

BRIEF DESCRIPTION OF DRAWINGS

The accompanying drawings are intended to better understand the solutions and do not limit the present disclosure. In the drawings.

DETAILED DESCRIPTION OF PREFERRED EMBODIMENTS

Exemplary embodiments of the present disclosure are described below with reference to the accompanying drawings, including various details of the embodiments of the present disclosure to facilitate understanding, and they should be considered as exemplary only. Therefore, those of ordinary skill in the art should be aware that the embodiments described here may be changed and modified in various ways without deviating from the scope and spirit of the present disclosure. Similarly, for the sake of clarity and simplicity, descriptions of well-known functions and structures are omitted in the following description.

Figure 1:
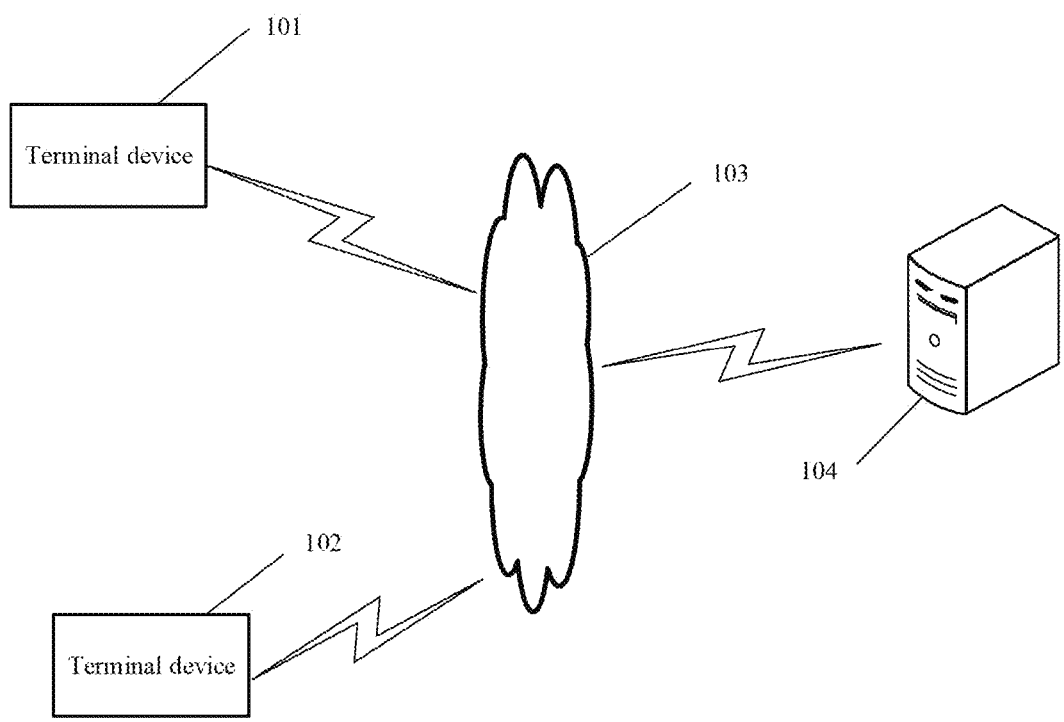
FIG. 1 illustrates an exemplary system architecture to which embodiments of the present disclosure can be applied.

FIG. 1 illustrates an exemplary system architecture to which embodiments of the present disclosure can be applied. As shown in FIG. 1, the system architecture may include terminal devices 101 and 102, a network 103 and a server 104. The network 103 is a medium used to provide communication links between the terminal devices 101, 102, and the server 104. The network 103 may include various types of connections, such as wired, wireless communication links, or fiber optic cables.

A user may use the terminal devices 101 and 102 to interact with the server 104 through the network 103. Various applications such as map applications, voice interaction applications, webpage browser applications, and communication applications may be installed on the terminal devices 101 and 102.

The terminal devices 101 and 102 may be a variety of electronic devices that can support and display mapping applications, including, but not limited to, smart phones, tablets, smart wearable devices, and so on. The apparatus provided in the present disclosure may be provided and run in the server 104. The apparatus may be implemented as a plurality of software or software modules (for example, to provide distributed services), or as a single software or software module, which is not specifically limited herein.

For example, an apparatus for sorting geographic location points is provided and running in the server 104. The server 104 may receive a query request for geographic location points of a vertical class from the terminal device 101 or 102. The query request includes user related information and vertical class information. The apparatus for sorting geographic location points sorts the geographic location points by using the manner provided in the embodiments of the present disclosure, and determines a query result returned to the user according to a sorting result. The query result may be returned to the terminal device 101 or 102. Map application data is maintained at the server 104, which may be stored locally on the server 104 or stored in other servers and called by the server 104.

For another example, the apparatus for training a sorting model is provided and running in the server 104, and the server 104 trains the sorting model by using map application data.

The server 104 may be either a single server or a server cluster consisting of a plurality of servers. It should be understood that the number of terminal devices, networks, and servers in FIG. 1 is only schematic. Any number of terminal devices, networks, and servers is possible according to implementation requirements.

Sorting features of hotel POIs in the existing technology are not sufficient, which do not reflect user personalization factors. The features adopted only rely on the characteristics of the hotel POIs, and have nothing to do with users; as a result, query results of hotel POIs initiated by different users in the same place are exactly the same, which does not reflect differences in user preferences. For example, a user with a higher income has a higher level of consumption, and he prefers hotels with higher prices and better conditions to check in nearby when using map applications to query the hotel POIs. When query results are returned to the user according to the existing technology, the preference information is not taken into account, and he is treated like any other ordinary user. In this way, hotels ranked in the top of the query results may have high price performance and popularity, but they do not fit with his preference for high consumption, high quality and nearby check-in, and user experience is relatively poor.

The core idea of the present disclosure is to integrate the user's preference for geographic location points of a vertical class into sorting of a sorting model as one of the sorting features, so that a sorting result reflects the user's personalized need. The methods and apparatuses provided in the present disclosure are described in detail below with reference to embodiments.

The geographic location points in the present disclosure refers to geographic location points in the map application data, which may be searched and browsed by users and displayed to the users, etc. The geographic location points have basic attributes such as latitude and longitude, name, administrative address, and type. The geographic location points may include, but are not limited to, POI (Point Of Interest), AOI (Area Of Interest), ROI (Region Of Interest), etc. POIs are taken as an example for description in subsequent embodiments.

In addition, the "vertical class" in the present disclosure refers to a type in a particular field, requirement, or industry. The methods provided in the present disclosure are applicable to a variety of vertical classes, and in particular to geographic location points of a consumer class, for example, hotels, restaurants, theaters, supermarkets, and so on. Hotels are taken as an example for description in subsequent embodiments.

Embodiment 1

Figure 2:
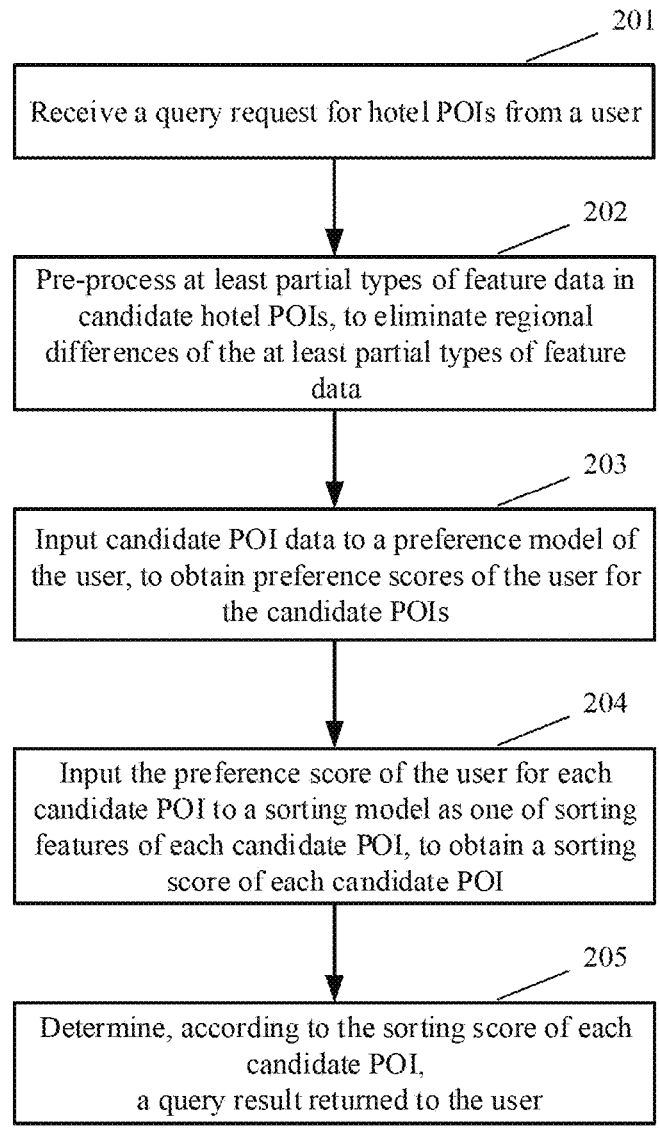
FIG. 2 is a flow chart of a method for sorting geographic location points according to Embodiment 1 of the present disclosure.

FIG. 2 is a flow chart of a method for sorting geographic location points according to Embodiment 1 of the present disclosure. Sorting of hotel POIs are taken as an example in the present embodiment. As shown in FIG. 2, the method may include the following steps:

In 201, a query request for hotel POIs from a user is received.

The user may input keywords representing vertical class information such as "hotel". "inn", and "guesthouse" in a search box of map applications, so as to trigger a query request for hotel POIs. The user may also click a "Hotel" label or button in a "Find Around" functional interface, so as to trigger a query request for hotel POIs. Certainly, in addition to the two situations, the query request for hotel POIs may also be triggered in other manners, which is not limited in the present disclosure.

It should be noted that, the query request may be used to query POI information of a specific vertical class, rather than to query a specific POI, which may be regarded as a relatively general query requirement.

In 202, at least partial types of feature data in candidate hotel POIs is pre-processed, to eliminate regional differences of the at least partial types of feature data.

The candidate hotel POIs are determined at first, and all hotel POIs in a map database may be taken as candidate POIs. However, to reduce the amount of computation, preferably, the remaining hotel POIs may be taken as candidate geographic locations after at least one of the following filtering processing is performed on the hotel POIs in the map database:

Geographic locations beyond a preset distance threshold from the current location are filtered out according to the current location of the user. That is, geographic locations that are obviously too far away from the user are filtered out.

Hotel POIs whose correlation with a query history of the user is lower than a preset correlation threshold are filtered out according to the query history of the user. For example, hotel POIs that the user has never queried may be directly filtered out, and so on.

For some vertical classes, POIs of different locations show obvious regional differences in some features. Hotel POIs are more obvious in this regard. For example, hotels prices in Beijing are higher than those in most cities in China, which makes it difficult to extract user preferences from users' historical access data, especially when the users' access behaviors occur in multiple regions. For example, a user 1 clicks on hotel POIs with a price of 300 Yuan in Wudaokou, Beijing, and a user 2 also clicks on hotel POIs with a price of 300 Yuan in a small city at a low economic level. Obviously, the user 2 prefers a higher hotel price, which is due to different pricing levels in different cities. In addition to the price, other features such as the number of comments, popularity, etc. also have similar regional differences. In order to eliminate the difference, feature data of a region-sensitive type in the candidate hotel POIs is pre-processed in this step. For example, as described above, for the hotel POIs, price feature data, comment feature data, popularity feature data and so on are preprocessed.

In the embodiment of the present disclosure, data of the candidate hotel POIs may include a variety of feature data of the candidate POIs. The feature data is generally correlated with attributes of the hotel POIs, for example, price, comment, location, star rating, popularity, and so on.

Specifically, during the pre-processing, the at least partial types of feature data in the candidate hotel POIs may be Box-cox transformed to enhance normality thereof, and then normalized.

The Box-cox transformation is a generalized power transformation method proposed by Box and cox. A main feature of the Box-cox transformation is to introduce parameters, estimate the parameters by the data itself, and then determine a data transformation form. The Box-cox transformation may significantly improve the normality, symmetry and variance equality of the data.

Assuming that the distribution of values of POIs of a region A on a feature F is expressed as S(A,F), for each value x in S(A,F), x∈S(A,F), Box-cox transformation by taking $\lambda(A,F)$ as a parameter is performed, and x after the transformation is expressed as $x^b$:

$$x^b = f_{Box-cox}(x) = \begin{cases} \dfrac{x^{\lambda(A,F)} - 1}{\lambda(A, F)}, & \lambda(A, F) > 0 \\ \ln x, & \lambda(A, F) = 0 \end{cases}$$

then normalization is performed, and after the normalization, it is expressed as $x^n$:

$$x^n = f_{norm}(x^b) = \dfrac{x^b - \text{Mean}(S(A, F)^b)}{Std(S(A, F)^b)}$$

where $\text{Mean}(S(A,F)^b)$ and $std(S(A,F)^b)$ represent the mean and standard deviation of a value set $S(A,F)^b$ after the transformation. $\lambda(A,F)$ is obtained in advance by conducting statistics on all the values S(A,F) of hotel POIs of the region A on the feature F. For example, a maximum likelihood estimation method is used to calculate $\lambda(A,F)$ to make the distribution of $\lambda(A,F)$ after the transformation follow normal distribution, then $\text{Mean}(S(A,F)^b)$ and $\text{std}(S(A,F)^b)$ may also be pre-calculated, and the parameters may be saved and directly used in the transformation.

After the normalization, $S(A,F)^n=\{x^n=f_{norm}(x^b)x^b\in S(A,F)^b\}$ approximately follows the standard normal distribution $N(D,1)$. In this way, values of the feature F of different regions no longer have strong regional differences after the above transformation.

In 203, candidate POI data is inputted to a preference model of the user, to obtain preference scores of the user for the candidate POIs.

In the embodiment of the present disclosure, the preference model is pre-trained for each user. The preference model of the user can output a preference score of the user for a POI when the POI is inputted. If a user ID initiating a query request is k, a preference score of the user k for each candidate POI is obtained by using a preference model for the user k.

As a preferred implementation mode, the preference model of the user adopts an outlier detection model, and the preference scores of the user for the candidate POs are obtained according to outlier scores of the outlier detection model for the candidate POIs, wherein the outlier scores are negatively correlated with the preference scores.

A training process for the preference model of the user will be detailed in Embodiment 2.

In 204, the preference score of the user for each candidate POI is inputted to a sorting model as one of sorting features of each candidate POI, to obtain a sorting score of each candidate POI.

In this step, the preference score of the user for the candidate POI is taken as an additional feature of the POI to be inputted to a sorting model along with other features of the candidate POI adopted by the sorting model, and the sorting model obtains a sorting score of the candidate POI.

In the present disclosure, the mechanism of the sorting model itself is not changed, only features considered in sorting are added, and user personalization factors, namely, user preferences, are taken into consideration. In addition to the user's preference for the candidate POIs, the sorting features adopted by the sorting model may also include other feature data of the POIs such as price, comment, star rating, popularity and location. A training process for the sorting model will be described in detail in Embodiment 2.

In 205, a query result returned to the user is determined according to the sorting score of each candidate POI.

In this step, the query result may be returned to the user in order of sorting scores from high to low for each candidate POI. For example, on the first page of the query result, the sorting scores of the candidate POIs ranking in the top M are returned. When the user clicks the next page or the drop-down page, the candidate POIs ranking in the $M+1^{th}$ to the $2M^{th}$ are continuously returned, and so on. M is a preset positive integer, or is determined depending on the number of candidate POIs that can be displayed on the page.

Embodiment 2

Figure 3:
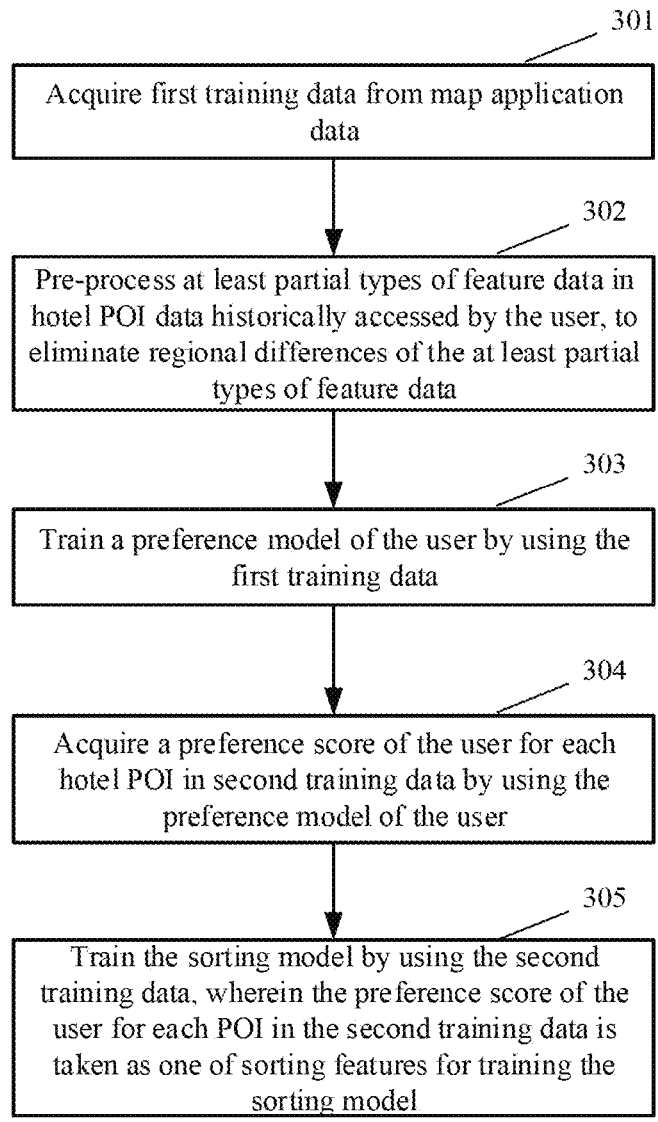
FIG. 3 is a flow chart of a method for training a sorting model according to Embodiment 2 of the present disclosure.

FIG. 3 is a flow chart of a method for training a sorting model according to Embodiment 2 of the present disclosure. As shown in FIG. 3, the method may include the following steps:

In 301, first training data is acquired from map application data.

The first training data may include hotel POI data historically accessed by a user, for example, hotel POI data queried by the user, hotel POI data clicked by the user, POI data field-visited by the user, and so on.

The hotel POI data queried by the user may be data of specific hotel POIs inputted by the user in the search box of the map applications.

The hotel POI data clicked by the user may be data of hotel POIs clicked by the user in the query result, data of hotel POIs clicked by the user in a map interface, data of hotel POIs clicked by the user in the process of browsing recommendation information, and so on.

The POI data field-visited by the user may be the user staying and punching in hotel POIs through a positioning function, making hotel reservation through a hotel reservation function of the map applications, or making hotel settlement through a settlement function of map applications, etc., all of which indicate that the user actually visits the hotel POIs.

The hotel POI data may include a variety of feature data of hotel POIs. The feature data is generally correlated with attributes of the hotel POIs, for example, price, comment, location, star rating, popularity, and so on.

In 302, at least partial types of feature data in hotel POI data historically accessed by the user is pre-processed, to eliminate regional differences of the at least partial types of feature data.

Specifically, at least partial types of feature data in hotel POI data historically accessed by the user may be Box-cox transformed and then normalized. The manners of Box-cox transformation and normalization may be obtained with reference to related description of step 202 in Embodiment 1.

The pre-processed at least partial types of feature data refer to feature data of a region-sensitive type. For example, for the hotel POIs, price feature data, comment feature data, popularity feature data and so on are preprocessed.

Parameters $\lambda(A,F)$ $\text{Mean}(S(A,F)^b)$ and $\text{std}(S(A,F)^b)$ used during Box-cox transformation are obtained in advance by conducting statistics on data distribution of hotel POIs of each region on features of the at least partial types. For example, the hotel POIs are classified according to regions, statistics is conducted on the distribution of feature data of hotel POIs in different regions respectively, then a maximum likelihood estimation method is used to calculate $A(A,F)$ to make the distribution of $\lambda(A,F)$ after the transformation follow normal distribution, and then $\text{Mean}(S(A,F)^b)$ and $\text{std}(S(A,F)^b)$ may also be pre-calculated.

In 303, a preference model of the user is trained by using the first training data.

The first training data actually classifies the hotel POIs according to users generating the data. A preference model is trained for each user by using the hotel POIs historically accessed by the user. For example, if there are L users, preference models for the L users may be established.

A neural network may be adopted when the preference model of the user is trained. However, due to the large number of users, the complex structure of the neural network may lead to great computing and storage overheads. Therefore, a preferred implementation solution is adopted in the embodiment of the present disclosure. That is, the preference model of the user adopts an outlier detection model, and the outlier detection model may be trained by using the hotel POIs accessed by the user. Namely, the outlier detection model fits its distribution from the hotel POIs accessed by the user. Then, for a new hotel POI, it may be judged whether it is an outlier or a normal point. If it is an outlier, a score of it belonging to an outlier may be given. Certainly, outliers and normal points may also be distinguished uniformly by using outlier scores.

Then, the preference scores of the user for the geographic location points of the vertical class are obtained according to outlier scores of the outlier detection model for the hotel POIs. The outlier scores are negatively correlated with the preference scores. That is, a higher outlier score of the outlier detection model for a hotel POI indicates that the hotel POI is more likely to belong to an outlier, which is further from the user preference.

The type of the outlier detection model in the present disclosure is not limited, any existing outlier detection model may be adopted for implementation.

In 304, a preference score of the user for each hotel POI in second training data is acquired by using the preference model of the user.

In the embodiment of the present disclosure, the second training data used may follow the training data for training a sorting model in the existing technology. That is, POI pairs are extracted from a large number of user historical data in the map application data. The POI pairs can reflect that the sorting of one POI is better than that of another POI. For example, the second training data may include: POI pairs formed by POIs clicked by the user and POIs not clicked by the user in the same query session of a hotel class. For example, if a user clicks on hotel POI1 in a query result corresponding to a hotel query, POI1 may be taken as a positive sample, and then one such as POI2 from other hotel POIs that have not been clicked may be taken as a negative sample. Then "POI1-POI2" forms a training sample.

In this step, for each POI in the POI pair, a preference score of the user for each POI may be acquired by using the preference model of the user.

In 305, the sorting model is trained by using the second training data, wherein the preference score of the user for each POI in the second training data is taken as one of sorting features for training the sorting model.

When the sorting model is trained by using the second training data, feature data may be extracted from POI data in POI pairs of the training samples. The feature data may follow the feature data adopted in the existing technology, such as price, comment, star rating, popularity and location of the POIs. The feature data is inputted to the sorting model (LTR, Learning to Rank) as sorting features along with the preference scores of the user for the POIs in the training samples obtained in step 304, and sorting scores of the POIs are obtained from the sorting model. When the sorting model is trained, a training objective may be: to maximize a difference between sorting scores of a positive sample POI and a negative sample POI in the same training sample.

It can be seen that the mechanism of the sorting model itself is not changed, only features considered in sorting are added, and user personalization factors, namely, user preferences, are taken into consideration.

After the training through the above process, the user's preference model and the sorting model may jointly complete the sorting of each candidate hotel POI as described in Embodiment 1.

The above is detailed description of the methods provided in the present disclosure. The apparatuses provided in the present disclosure are described in detail below with reference to embodiments.

Embodiment 3

Figure 4:
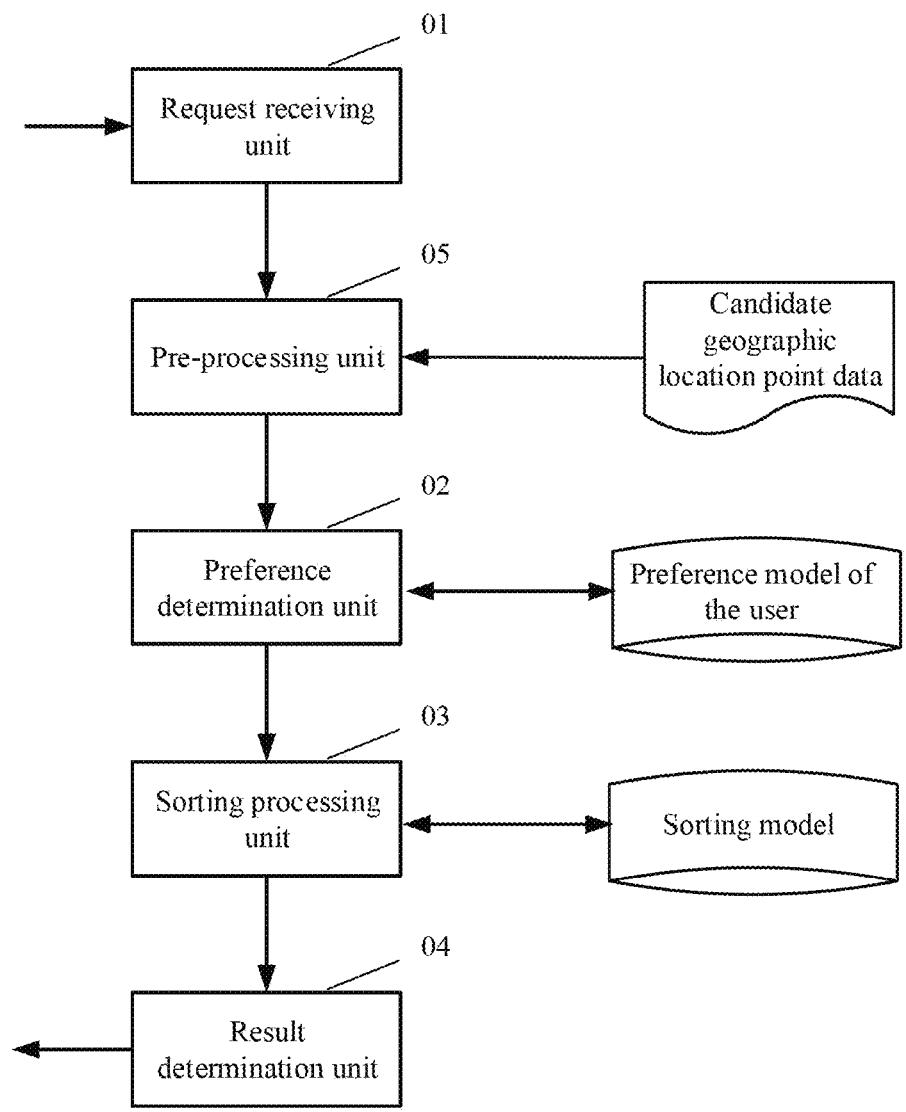
FIG. 4 is a structural diagram of an apparatus for sorting geographic location points according to Embodiment 3 of the present disclosure.

FIG. 4 is a structural diagram of an apparatus for sorting geographic location points according to Embodiment 3 of the present disclosure. As shown in FIG. 4, the apparatus may include: a request receiving unit 01, a preference determination unit 02, a sorting processing unit 03 and a result determination unit 04, and may further include: a pre-processing unit 05. Main functions of various component units are as follows: The request receiving unit 01 is configured to receive a query request for geographic location points of a vertical class from a user.

The user may input keywords representing vertical class information in a search box of map applications, so as to trigger a query request for geographic location points of a vertical class. The user may also click a vertical class label or button in a "Find Around" functional interface, so as to trigger a query request for geographic location points of a vertical class. Certainly, in addition to the two situations, the query request may also be triggered in other manners, which is not limited in the present disclosure.

The preference determination unit 02 is configured to input candidate geographic location point data of the vertical class into a preference model of the user, to obtain a preference score of the user for each candidate geographic location point.

When candidate geographic location points are determined, all geographic location points of the vertical class in a map database may be taken as candidate POIs. However, to reduce the amount of computation, preferably, the remaining geographic location points may be taken as candidate geographic locations after at least one of the following filtering processing is performed on the geographic location points of the vertical class in the map database:

Geographic location points beyond a preset distance threshold from the current location are filtered out according to the current location of the user. That is, geographic location points that are obviously too far away from the user are filtered out.

Geographic location points whose correlation with a query history of the user is lower than a preset correlation threshold are filtered out according to the query history of the user. For example, geographic location points that the user has never queried may be directly filtered out, and so on.

Preferably, the preference model of the user may adopt an outlier detection model, and the preference scores of the user for the candidate geographic location points are obtained according to outlier scores of the outlier detection model for the candidate geographic location points, wherein the outlier scores are negatively correlated with the preference scores.

The sorting processing unit 03 is configured to input the preference score of the user for each candidate geographic location point into a sorting model as one of sorting features of each candidate geographic location point, to obtain a sorting score of each candidate geographic location point.

In the present disclosure, the mechanism of the sorting model itself is not changed, only features considered in sorting are added, and user personalization factors, namely, user preferences, are taken into consideration. In addition to the user's preference for the candidate geographic location points, the sorting features adopted by the sorting model may also include other feature data of the geographic location points such as price, comment, star rating, popularity and location.

The result determination unit 04 is configured to determine, according to the sorting score of each candidate geographic location point, a query result returned to the user.

The pre-processing unit 05 is configured to pre-process at least partial types of feature data in the candidate geographic location point data of the vertical class and then provide the at least partial types of feature data for the preference determination unit 02, to eliminate regional differences of the at least partial types of feature data.

Specifically, the pre-processing unit 05 Box-cox transforms and then normalizes the at least partial types of feature data in the candidate geographic location point data of the vertical class, wherein parameters used in the Box-cox transformation are obtained in advance by conducting statistics on data distribution of geographic location points of each region on features of the at least partial types.

Embodiment 4

Figure 5:
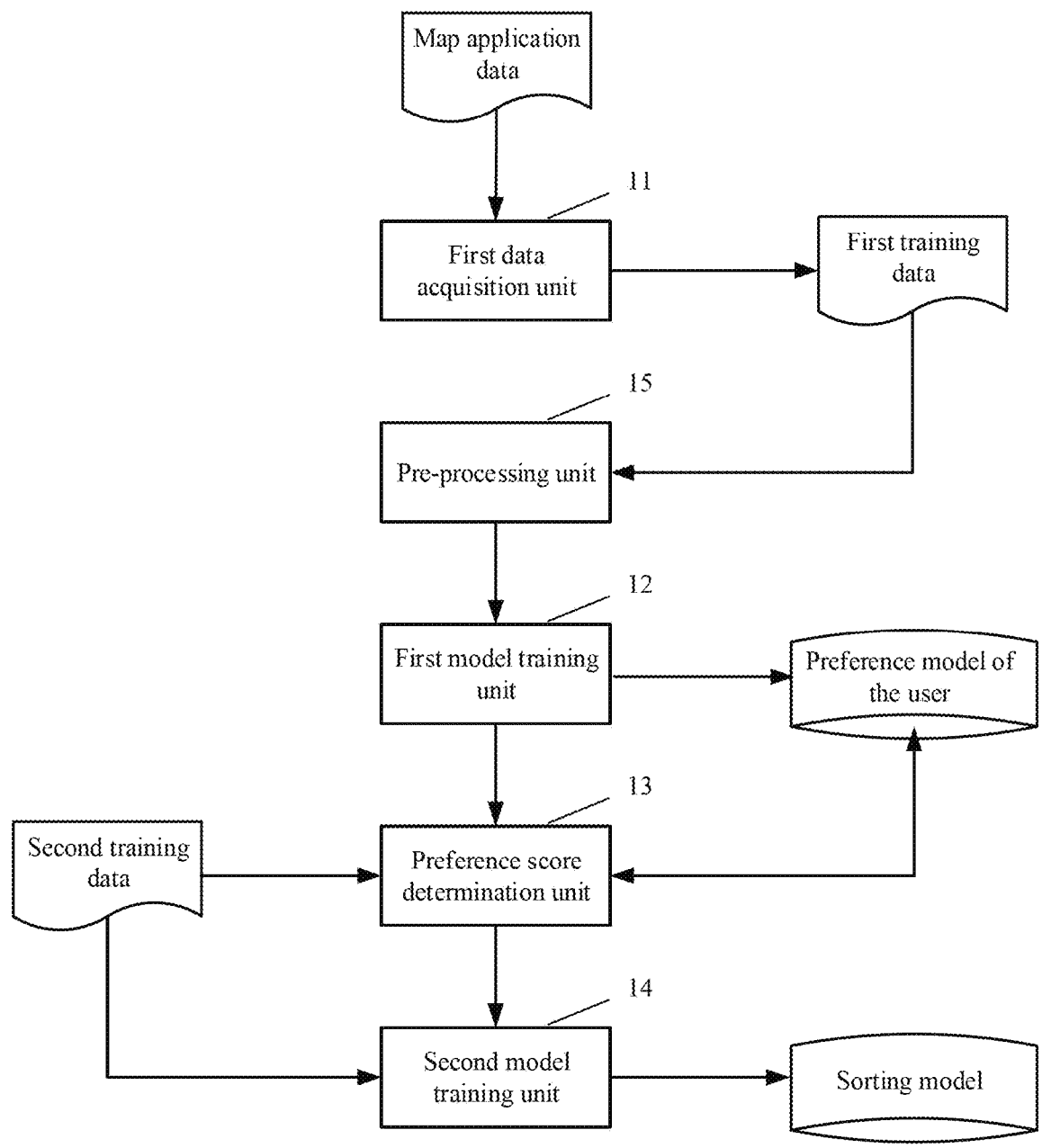
FIG. 5 is a structural diagram of an apparatus for training a sorting model according to Embodiment 4 of the present disclosure.

FIG. 5 is a structural diagram of an apparatus for training a sorting model according to Embodiment 4 of the present disclosure. As shown in FIG. 5, the apparatus may include: a first data acquisition unit 11, a first model training unit 12, a preference score determination unit 13 and a second model training unit 14, and may further include a pre-processing unit 15. Main functions of various component units are as follows:

The first data acquisition unit 11 is configured to acquire first training data from map application data, the first training data including: geographic location point data of a vertical class historically accessed by a user, the access including query, click, or field visit.

The geographic location point data of the vertical class may include a variety of feature data of geographic location points of the vertical class. The feature data is generally correlated with attributes of the geographic location point data of the vertical class, for example, price, comment, location, star rating, popularity, and so on.

The first model training unit 12 is configured to train a preference model of the user by using the first training data.

A neural network may be adopted when the preference model of the user is trained. However, due to the large number of users, the complex structure of the neural network may lead to great computing and storage overheads. Therefore, preferably, the first model training unit 12 trains the preference model of the user by using an outlier detection model, and the preference scores of the user for the geographic location points of the vertical class are obtained according to outlier scores of the outlier detection model for the geographic location points of the vertical class, wherein the outlier scores are negatively correlated with the preference scores.

The preference score determination unit 13 is configured to acquire a preference score of the user for each geographic location point of the vertical class in second training data by using the preference model of the user.

In the present disclosure, the second training data may be acquired by a second data acquisition unit (the unit in the existing technology, which is not shown in the figure). In the embodiment of the present disclosure, the second training data used may follow the training data for training a sorting model in the existing technology. That is, geographic location point pairs are extracted from a large number of user historical data in the map application data. The geographic location point pairs can reflect that the sorting of one geographic location point is better than that of another geographic location point. For example, the second training data may include: geographic location point pairs formed by geographic location points clicked by the user and geographic location points not clicked by the user in the same query session of a vertical class. For example, if a user clicks on hotel POI1 in a query result corresponding to a hotel query, POI1 may be taken as a positive sample, and then one such as POI2 from other hotel POIs that have not been clicked may be taken as a negative sample. Then "POI1-POI2" forms a training sample.

The second model training unit 14 is configured to train the sorting model by using the second training data, wherein the preference score of the user for each geographic location point in the second training data is taken as one of sorting features for training the sorting model.

When the sorting model is trained by using the second training data, feature data may be extracted from geographic location point data in geographic location point pairs of the training samples. The feature data may follow the feature data adopted in the existing technology, such as price, comment, star rating, popularity, and location of the geographic location points. The feature data is inputted to the sorting model (LTR, Learning to Rank) as sorting features along with the preference scores of the user for the geographic location points in the training samples obtained by the preference score determination unit 13, and sorting scores of the POIs are obtained from the sorting model. When the sorting model is trained, a training objective may be: to maximize a difference between sorting scores of a positive sample geographic location point and a negative sample geographic location point in the same training sample.

The pre-processing unit 15 is configured to pre-process at least partial types of feature data in the geographic location point data of the vertical class historically accessed by the user and then provide the at least partial types of feature data for the first model training unit 12, to eliminate regional differences of the at least partial types of feature data.

Specifically, the pre-processing unit 15 may Box-cox transform and then normalize the at least partial types of feature data in the candidate geographic location point data of the vertical class historically accessed by the user, wherein parameters used in the Box-cox transformation are obtained in advance by conducting statistics on data distribution of geographic location points of each region on features of the at least partial types.

It can be seen from the above embodiments that the technical solutions provided in the embodiments of the present disclosure can have the following advantages:

1) User preference factors can be integrated into sorting when a user queries geographic location points of a vertical class such as hotels, restaurants, theaters and supermarkets, so that the user can rapidly find a hotel meeting his own preference in the query results, which reduces the number of times the user goes through and clicks the query results, saves the user's time, and improves the user's experience in query with map applications.

2) The present disclosure optimizes a sorting framework on the basis of keeping a sorting mechanism of an existing sorting model as much as possible to ensure the stability and efficiency of the existing sorting framework.

According to an embodiment of the present disclosure, the present disclosure further provides an electronic device and a readable storage medium.

Figure 6:
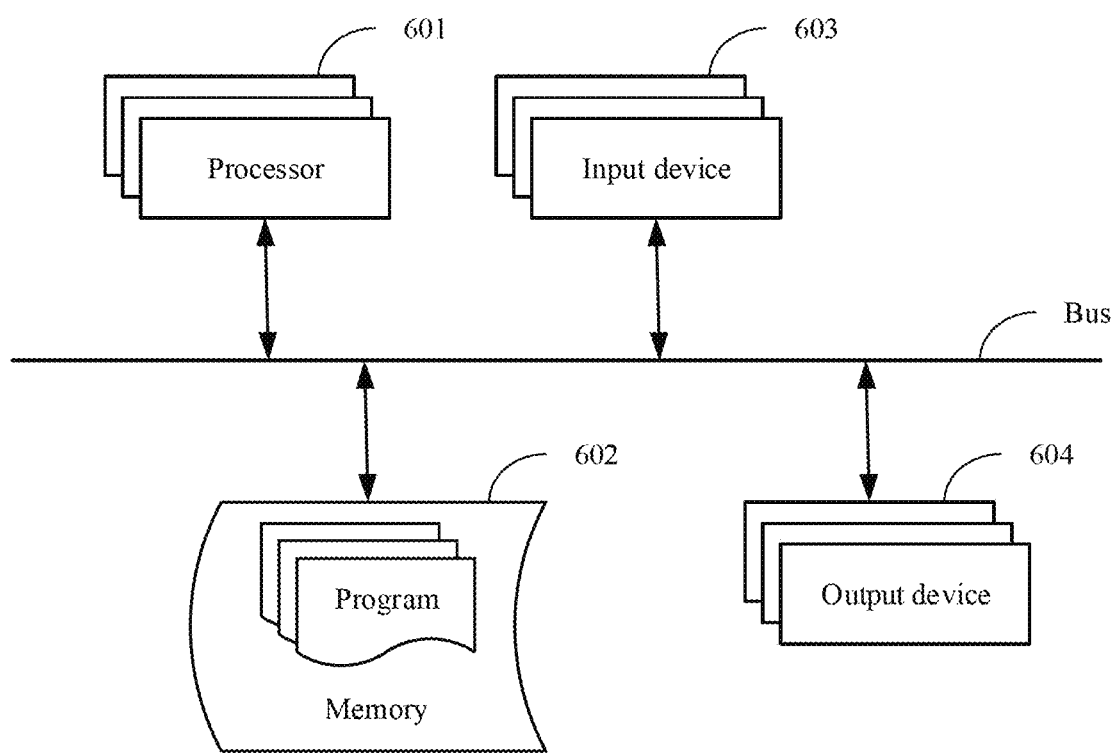
FIG. 6 is a block diagram of an electronic device for implementing the embodiments of the present disclosure.

As shown in FIG. 6, it is a block diagram of an electronic device of a method for sorting geographic location points and a method for training a sorting model according to an embodiment of the present disclosure. The electronic device is intended to represent various forms of digital computers, such as laptops, desktops, workbenches, personal digital assistants, servers, blade servers, mainframe computers and other suitable computers. The electronic device may further represent various forms of mobile devices, such as personal digital assistant, cellular phones, smart phones, wearable devices and other similar computing devices. The components, their connections and relationships, and their functions shown herein are examples only, and are not intended to limit the implementation of the present disclosure as described and/or required herein.

As shown in FIG. 6, the electronic device includes: one or more processors 601, a memory 602, and interfaces for connecting various components, including high-speed and low-speed interfaces. The components are connected to each other by using different buses and may be mounted on a common motherboard or otherwise as required. The processor may process instructions executed in the electronic device, including instructions stored in the memory or on the memory to display graphical information of a GUI on an external input/output device (such as a display device coupled to the interfaces). In other implementation modes, multiple processors and/or buses may be used together with multiple memories, if necessary. Similarly, multiple electronic devices may be connected, each of which provides some necessary operations (for example, as a server array, a set of blade servers, or a multiprocessor system). One processor 601 is taken as an example is FIG. 6.

The memory 602 is the non-transitory computer-readable storage medium provided in the present disclosure. The memory stores instructions executable by at least one processor to make the at least one processor perform the method for sorting geographic location points and the method for training a sorting model provided in the present disclosure. The non-transitory computer-readable storage medium in the present disclosure stores computer instructions. The computer instructions are used to make a computer perform the method for sorting geographic location points and the method for training a sorting model provided in the present disclosure.

The memory 602, as a non-transitory computer-readable storage medium, may be configured to store non-transitory software programs, non-transitory computer executable programs and modules, for example, program instructions/modules corresponding to the method for sorting geographic location points and the method for training a sorting model provided in the present disclosure. The processor 601 runs the non-transitory software programs, instructions and modules stored in the memory 602 to execute various functional applications and data processing of a server, that is, to implement the method for sorting geographic location points and the method for training a sorting model in the above method embodiments.

The memory 602 may include a program storage area and a data storage area. The program storage area may store an operating system and an application required by at least one function; and the data storage area may store data created according to use of the electronic device. In addition, the memory 602 may include a high-speed random access memory, and may further include a non-transitory memory, for example, at least one disk storage device, a flash memory device, or other non-transitory solid-state storage devices. In some embodiments, the memory 602 optionally includes memories remotely disposed relative to the processor 601. The remote memories may be connected to the electronic device over a network. Examples of the network include, but are not limited to, the Internet, intranets, local area networks, mobile communication networks and combinations thereof.

The electronic device may further include: an input device 603 and an output device 604. The processor 601, the memory 602, the input device 603 and the output device 604 may be connected through a bus or in other manners. In FIG. 6, the connection through a bus is taken as an example.

The input device 603 may receive input numerical information or character information, and generate key signal input related to user setting and function control of the electronic device, for example, input devices such as a touch screen, a keypad, a mouse, a trackpad, a touch pad, a pointer, one or more mouse buttons, a trackball, and a joystick. The output device 604 may include a display device, an auxiliary lighting device (e.g., an LED) and a tactile feedback device (e.g., a vibration motor). The display device may include, but is not limited to, a liquid crystal display (LCD), a light-emitting diode (LED) display and a plasma display. In some implementation modes, the display device may be a touch screen.

Various implementation modes of the systems and technologies described here can be implemented in a digital electronic circuit system, an integrated circuit system, an ASIC (application-specific integrated circuit), computer hardware, firmware, software, and/or combinations thereof. The various implementation modes may include: being implemented in one or more computer programs, wherein the one or more computer programs may be executed and/or interpreted on a programmable system including at least one programmable processor, and the programmable processor may be a special-purpose or general-purpose programmable processor, receive data and instructions from a storage system, at least one input device and at least one output device, and transmit the data and the instructions to the storage system, the at least one input device and the at least one output device.

The computing programs (also referred to as programs, software, software applications, or code) include machine instructions for programmable processors, and may be implemented by using high-level procedural and/or object-oriented programming languages, and/or assembly/machine languages. As used herein, the terms "machine-readable medium" and "computer-readable medium" refer to any computer program product, device, and/or apparatus (e.g., a magnetic disk, an optical disc, a memory, and a programmable logic device (PLD)) configured to provide machine instructions and/or data to a programmable processor, including a machine-readable medium that receives machine instructions serving as machine-readable signals. The term "machine-readable signal" refers to any signal for providing the machine instructions and/or data to the programmable processor.

To provide interaction with a user, the systems and technologies described here can be implemented on a computer. The computer has: a display device (e.g., a CRT (cathode-ray tube) or an LCD (liquid crystal display) monitor) for displaying information to the user, and a keyboard and pointing device (e.g., a mouse or trackball) through which the user may provide input for the computer. Other kinds of apparatuses may also be configured to provide interaction with the user. For example, a feedback provided for the user may be any form of sensory feedback (for example, visual, auditory, or tactile feedback); and input from the user may be received in any form (including sound input, voice input, or tactile input).

The systems and technologies described here can be implemented in a computing system including background components (for example, as a data server), or a computing system including middleware components (for example, an application server), or a computing system including front-end components (for example, a user computer with a graphical user interface or webpage browser through which the user can interact with the implementation mode of the systems and technologies described here), or a computing system including any combination of such background components, middleware components or front-end components. The components of the system can be connected to each other through any form or medium of digital data communication (for example, a communication network). Examples of the communication network include: a local area network (LAN), a wide area network (WAN), and the Internet.

The computer system may include a client and a server. The client and the server are generally far away from each other and generally interact via the communication network. A relationship between the client and the server is generated through computer programs that run on a corresponding computer and have a client-server relationship with each other.

The above specific implementation mode does not limit the extent of protection of the present disclosure. Those skilled in the art should understand that various modifications, combinations, sub-combinations, and replacements can be made according to design requirements and other factors. Any modifications, equivalent substitutions and improvements made within the spirit and principle of the present disclosure all should be included in the extent of protection of the present disclosure.

What is claimed is:

1. A computer-implemented method for sorting geographic location points, wherein the method comprises:
   receiving a query request for geographic location points of a vertical class from a user, the vertical class referring to a type in a particular field, requirement, or industry;
   inputting candidate geographic location point data of the vertical class into a preference model of the user, to obtain a preference score of the user for each candidate geographic location point;
   inputting the preference score of the user for each candidate geographic location point into a sorting model as one of sorting features of each candidate geographic location point, to obtain a sorting score of each candidate geographic location point; and
   determining, according to the sorting score of each candidate geographic location point, a query result returned to the user,
   wherein the preference model of the user adopts an outlier detection model, and the preference scores of the user for the candidate geographic location points are obtained according to outlier scores of the outlier detection model for the candidate geographic location points,
   wherein the outlier scores are negatively correlated with the preference scores, wherein the greater an outlier score, the smaller a preference score.

2. The method according to claim 1, wherein before the inputting candidate geographic location point data of the vertical class into a preference model of the user, the method further comprises:
   pre-processing at least partial types of feature data in the candidate geographic location point data of the vertical class, to eliminate regional differences of the at least partial types of feature data.

3. The method according to claim 2, wherein the pre-processing comprises:
   Box-cox transforming and then normalizing the at least partial types of feature data in the candidate geographic location point data of the vertical class,
   wherein parameters used in the Box-cox transformation are obtained in advance by conducting statistics on data distribution of geographic location points of each region on features of the at least partial types.

4. The method according to claim 1, wherein the vertical class comprises: a hotel class, a restaurant class, a supermarket class or a theater class.

5. A computer-implemented method for training a sorting model, wherein the method comprises:
   acquiring first training data from map application data, the first training data comprising: geographic location point data of a vertical class historically accessed by a user, the access comprising query, click, or field visit, the vertical class referring to a type in a particular field, requirement, or industry;
   training a preference model of the user by using the first training data;
   acquiring a preference score of the user for each geographic location point of the vertical class in second training data by using the preference model of the user; and
   training the sorting model by using the second training data, wherein the preference score of the user for each geographic location point in the second training data is taken as one of sorting features for training the sorting model,
   wherein the preference model of the user adopts an outlier detection model, and the preference scores of the user for the geographic location points of the vertical class are obtained according to outlier scores of the outlier detection model for the geographic location points of the vertical class,
   wherein the outlier scores are negatively correlated with the preference scores, wherein the greater an outlier score, the smaller a preference score.

6. The method according to claim 5, wherein before the training a preference model of the user by using the first training data, the method further comprises:
   pre-processing at least partial types of feature data in the geographic location point data of the vertical class historically accessed by the user, to eliminate regional differences of the at least partial types of feature data.

7. The method according to claim 6, wherein the pre-processing comprises:
   Box-cox transforming and then normalizing the at least partial types of feature data in the candidate geographic location point data of the vertical class historically accessed by the user,
   wherein parameters used in the Box-cox transformation are obtained in advance by conducting statistics on data distribution of geographic location points of each region on features of the at least partial types.

8. The method according to claim 5, wherein the second training data comprises: geographic location point pairs formed by geographic location points clicked by the user and geographic location points not clicked in the same query session of the vertical class.

9. An electronic device, comprising:
   at least one processor; and
   a memory communicatively connected with the at least one processor;
   wherein the memory stores instructions executable by the at least one processor, and the instructions are executed by the at least one processor to enable the at least one processor to perform a method for sorting geographic location points, wherein the method comprises:

receiving a query request for geographic location points of a vertical class from a user, the vertical class referring to a type in a particular field, requirement, or industry;

inputting candidate geographic location point data of the vertical class into a preference model of the user, to obtain a preference score of the user for each candidate geographic location point;

inputting the preference score of the user for each candidate geographic location point into a sorting model as one of sorting features of each candidate geographic location point, to obtain a sorting score of each candidate geographic location point; and determining, according to the sorting score of each candidate geographic location point, a query result returned to the user, wherein the preference model of the user adopts an outlier detection model, and the preference scores of the user for the geographic location points of the vertical class are obtained according to outlier scores of the outlier detection model for the geographic location points of the vertical class, wherein the outlier scores are negatively correlated with the preference scores, wherein the greater an outlier score, the smaller a preference score.

10. The electronic device according to claim 9, wherein before the inputting candidate geographic location point data of the vertical class into a preference model of the user, the method further comprises:

pre-processing at least partial types of feature data in the candidate geographic location point data of the vertical class, to eliminate regional differences of the at least partial types of feature data.

11. The electronic device according to claim 10, wherein the pre-processing comprises:

Box-cox transforming and then normalizing the at least partial types of feature data in the candidate geographic location point data of the vertical class, wherein parameters used in the Box-cox transformation are obtained in advance by conducting statistics on data distribution of geographic location points of each region on features of the at least partial types.

12. An electronic device, comprising:

at least one processor; and a memory communicatively connected with the at least one processor;

wherein the memory stores instructions executable by the at least one processor, and the instructions are executed by the at least one processor to enable the at least one processor to perform a method for training a sorting model, wherein the method comprises:

acquiring first training data from map application data, the first training data comprising:

geographic location point data of a vertical class historically accessed by a user, the access comprising query, click, or field visit, the vertical class referring to a type in a particular field, requirement, or industry;

training a preference model of the user by using the first training data;

acquiring a preference score of the user for each geographic location point of the vertical class in second training data by using the preference model of the user; and training the sorting model by using the second training data, wherein the preference score of the user for each geographic location point in the second training data is taken as one of sorting features for training the sorting model, wherein the preference model of the user adopts an outlier detection model, and the preference scores of the user for the geographic location points of the vertical class are obtained according to outlier scores of the outlier detection model for the geographic location points of the vertical class, wherein the outlier scores are negatively correlated with the preference scores, wherein the greater an outlier score, the smaller a preference score.

13. The electronic device according to claim 12, wherein before the training a preference model of the user by using the first training data, the method further comprises:

pre-processing at least partial types of feature data in the geographic location point data of the vertical class historically accessed by the user, to eliminate regional differences of the at least partial types of feature data.

14. The electronic device according to claim 13, wherein the pre-processing comprises:

Box-cox transforming and then normalizing the at least partial types of feature data in the candidate geographic location point data of the vertical class historically accessed by the user, wherein parameters used in the Box-cox transformation are obtained in advance by conducting statistics on data distribution of geographic location points of each region on features of the at least partial types.

15. A non-transitory computer-readable storage medium storing computer instructions therein, wherein the computer instructions are used to cause the computer to perform a method for sorting geographic location points, wherein the method comprises:

receiving a query request for geographic location points of a vertical class from a user, the vertical class referring to a type in a particular field, requirement, or industry;

inputting candidate geographic location point data of the vertical class into a preference model of the user, to obtain a preference score of the user for each candidate geographic location point;

inputting the preference score of the user for each candidate geographic location point into a sorting model as one of sorting features of each candidate geographic location point, to obtain a sorting score of each candidate geographic location point; and determining, according to the sorting score of each candidate geographic location point, a query result returned to the user, wherein the preference model of the user adopts an outlier detection model, and the preference scores of the user for the candidate geographic location points are obtained according to outlier scores of the outlier detection model for the candidate geographic location points, wherein the outlier scores are negatively correlated with the preference scores, wherein the greater an outlier score, the smaller a preference score.

16. A non-transitory computer-readable storage medium storing computer instructions therein, wherein the computer instructions are used to cause the computer to perform a method for training a sorting model, wherein the method comprises:

acquiring first training data from map application data, the first training data comprising: geographic location point data of a vertical class historically accessed by a user, the access comprising query, click, or field visit, the vertical class referring to a type in a particular field, requirement, or industry;

training a preference model of the user by using the first training data;

acquiring a preference score of the user for each geographic location point of the vertical class in second training data by using the preference model of the user; and training the sorting model by using the second training data, wherein the preference score of the user for each geographic location point in the second training data is taken as one of sorting features for training the sorting model, wherein the preference model of the user adopts an outlier detection model, and the preference scores of the user for the geographic location points of the vertical class are obtained according to outlier scores of the outlier detection model for the geographic location points of the vertical class, wherein the outlier scores are negatively correlated with the preference scores, wherein the greater an outlier score, the smaller a preference score.

* * * * *